(12) United States Patent
Habele et al.

(10) Patent No.: US 6,731,034 B1
(45) Date of Patent: May 4, 2004

(54) ELECTRIC MOTOR WITH ELECTROMAGNETIC BRAKE

(75) Inventors: Michael Habele, Waldenbuch (DE); Gerhard Kraemer, Aichtal (DE); Alfred Odendahl, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,341

(22) PCT Filed: Jul. 6, 1999

(86) PCT No.: PCT/DE99/02091
§ 371 (c)(1), (2), (4) Date: Sep. 28, 2001

(87) PCT Pub. No.: WO00/39912
PCT Pub. Date: Jul. 6, 2000

(30) Foreign Application Priority Data

Dec. 28, 1998 (DE) .............................. 198 60 396

(51) Int. Cl.⁷ ................................................ H02K 7/12
(52) U.S. Cl. ............................ 310/77; 310/91; 310/93; 318/362
(58) Field of Search ............................ 310/77, 91, 93; 318/93, 362, 366

(56) References Cited

U.S. PATENT DOCUMENTS

| | | | |
|---|---|---|---|
| 2,923,830 A | * | 2/1960 | Merriam ............... 290/38 A |
| 2,959,695 A | * | 11/1960 | Huff .......................... 310/77 |
| 5,444,317 A | * | 8/1995 | Anderson et al. ........ 310/77 |

FOREIGN PATENT DOCUMENTS

| | | | |
|---|---|---|---|
| CH | 489 136 | 4/1970 | |
| DE | 847 933 | 8/1952 | |
| EP | 1098914 | * 8/1955 | ............ H02K/7/12 |
| FR | 1 098 914 A | 8/1955 | |
| GB | 419 835 | 11/1934 | |
| GB | 920485 | 3/1963 | |

* cited by examiner

*Primary Examiner*—Burton S. Mullins
*Assistant Examiner*—Yahveh Comas
(74) *Attorney, Agent, or Firm*—Nixon Peabody LLP; David S. Safran

(57) ABSTRACT

An electric motor with an electromagnetic brake is disclosed, particularly for use in an angle grinder, which has a stator having at least one pole pair, in which at least one pole has a pole shoe which points to the inside towards the rotor periphery and is surrounded by a stator winding. The pole accommodates the brake means for braking of the rotor of the electric motor. The brake element can be adjusted against the braking force by the magnetic field of the stator winding when the motor is activated. The brake element is constructed of magnetically conductive material as a rocker which is exposed to the braking force off-center of the swivel axis of the brake element. As a result of the off-center application of force the brake element having a disengagement arm can be arranged in the magnetic flux of the stator winding such that a high disengagement moment can be achieved and rapid braking can occur at shutoff.

15 Claims, 1 Drawing Sheet

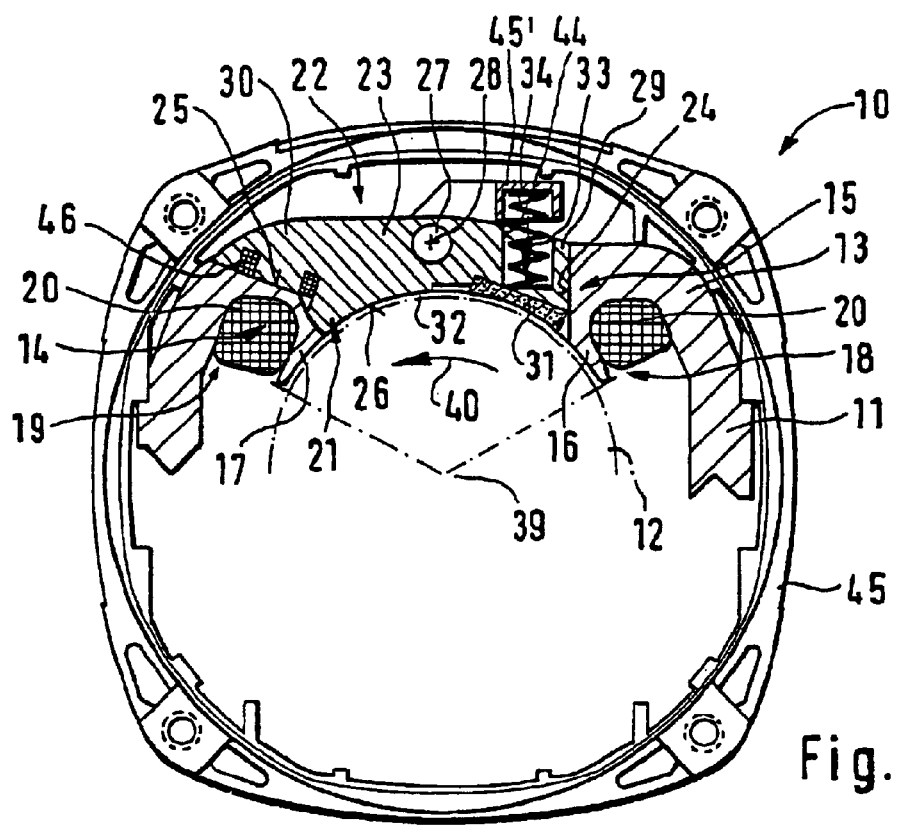
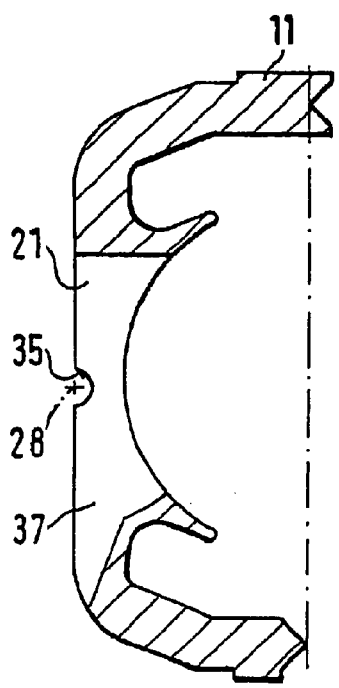
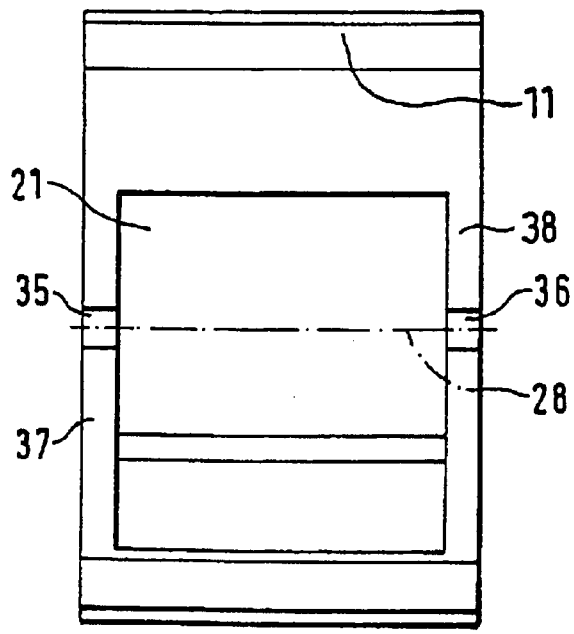
Fig. 1
Fig. 2
Fig. 3

ELECTRIC MOTOR WITH ELECTROMAGNETIC BRAKE

FIELD OF THE INVENTION

The invention relates to an electric motor provided with an electromagnetic brake having the ability to provide increased braking force to effect an efficient braking action.

DESCRIPTION OF RELATED ART

An electric motor with an electromagnetic brake is known (GB 920,485) in which the stator has two poles each having a pole shoe projecting to the inside and surrounded by the stator winding. The brake means comprises a brake element for braking of the rotor of the electric motor in which the brake is located symmetrically within one pole and is subjected to a braking force towards the middle. The brake element can be adjusted against the braking force by the magnetic field of the stator winding. The disadvantage in this arrangement of the brake element within the pole is that this arrangement does not permit high disengagement forces so that the brake element can only be provided with a relatively small braking force. The maximum attainable braking action of the brake means is therefore small such that the brake means is not suitable for use in angle grinders.

SUMMARY OF THE INVENTION

The electric motor of the invention is provided with an electromagnetic brake means that has the advantage of ensuring application of a high disengagement force so that a high braking force can be achieved resulting in a correspondingly good braking action. By constructing the brake element as a rocker upon which the braking force acts outside the pivoting axis of the brake element, the level of the disengagement force can be greatly increased. A brake means so constructed is thus much more efficient and is also suited for use in angle grinders.

BRIEF DESCRIPTION OF THE DRAWINGS

FIG. 1 shows a partial section through an electric motor of the invention;

FIG. 2 shows a section through a stator half without a brake element inserted therein; and FIG. 3 shows a top view of a stator pack of the electric motor of the invention.

DETAILED DESCRIPTION OF THE INVENTION

In FIG. 1 the electric motor, 10, has a stator 11 and a rotor 12. The stator 11, of which only the upper half is shown, forms a pole pair, one pole of which is shown at 14. The pole 14 has a pole shoe 15 which is pointed from the yoke 13 to the inside to the rotor periphery, and which emerges on both sides in pole horns 16, 17. Between the pole horns 16, 17 and the yoke 13 recesses 18, 19 are formed into which a stator winding 20 fits. The stator winding 20 thus surrounds the pole shoe 15.

In the stator 11 in the area of the pole shoe 15 a radially continuous free space 21 is formed into which a brake element 23 of a brake means 22 is inserted. The brake element 23 fills the inner part of the pole shoe 15 between the pole horns 16, 17. The brake element 23 forms lateral separating surfaces 24, 25 which extend radially relative to the stator 11 and the pole face 26 facing the rotor 12. The brake element 23 is made of magnetically conductive material so that passage of the magnetic flux induced by the stator winding 20 in the stator 11 and in the brake element 23 takes place in the separating surfaces 24, 25 and in the pole face 26.

The brake element 23 is made as a rocker which has one laterally projecting pin 27 each on the sides facing away from one another. The pins 27 form a pivoting axis 28 around which the brake element 23 is pivotally supported within limits relative to the stator 11. The brake element 23 is made as a multi-arm lever with lever arms 29, 30 which are located on either side of the pivoting axis 28. The lever arms 29, 30 are roughly at an angle of 180 degrees to one another, the brake element 23 being matched roughly to the ring structure of the yoke 13. The first of the lever arms 29, 30 forms a brake arm 29 which on the inside facing the rotor 12 bears a brake lining 31. The brake lining 31 is produced preferably from a material with little or no magnetic conductivity. The second of the lever arms 29, 30 is made as a disengagement arm 30 and in the area of the pole face 26 forms a narrow annular gap 32 with the rotor 12 which corresponds to the conventional motor air gap.

A compression spring 34 applies a braking force 33 to the brake arm 29 in the direction to the rotor 12. The brake element 23 is thus exposed to the braking force 33 outside of the pivoting axis 28, i.e. off-center, by which the braking moment around the pivoting axis 28 is produced. The pivoting axis 28 is thus parallel to the axis 39 of rotation of the rotor 12. The brake arm 29 has a plurality of blind holes 44 which are used to hold one compression spring 34 at a time. The compression springs 34 are on the other hand supported on a steady 45' which is attached to the stator 11.

The brake arm 29 is located in front of the pivoting axis 28 viewed in the direction of rotation 40 of the rotor 12, conversely the disengagement arm 30 is located behind the pivoting axis 28. In this way the braking action can be additionally increased by boosting the force by a force couple, which consists of friction force and bearing reaction force, forming a torque around the pivoting axis 28 in the direction of the braking force 33.

When the electric motor 10 is turned on, i.e. current flows through the stator winding 20, in the stator 11 a magnetic flux is induced which produces an attraction force on the brake element 23 in the separating surface 25 towards the stator 11 and in the pole face 26 towards the rotor 12. This attraction force causes a quantitatively higher disengagement moment which is pointed opposite the braking moment and which causes a disengagement motion of the brake element 23 opposite the braking moment. In the separating surfaces 24, 25 there is sufficient play of motion for this purpose, which allows the braking element 23 to execute limited pivoting motion around the pivoting axis 28 relative to the stator 11, the brake lining 31 then being lifted by the rotor 12. The separating surface 25 on the disengagement arm 30 has a greater radial distance from the pivoting axis 28 than the separating surface 24 on the brake arm 29 so that the attraction force acting in the separating surface 24 makes an especially high contribution to the disengagement moment. Since the braking arm 29 in the area of the pole face 26 has a greater distance from the rotor 12 than the disengagement arm 30 and since the braking arm 29 bears a non-magnetic brake lining 31, there are no noteworthy attraction forces at this point, in contrast to the high contribution disengagement moment in the disengagement arm 30.

In order to prevent frequency-induced vibration of the brake means 22 when current flows through the stator winding 20, in the disengagement arm 30 there is a short circuited turn 46 in the immediate vicinity of the separating surface 25.

When the electric motor 10 is turned off again, the magnetic action of the stator winding 20 abates so that the attraction force on the disengagement arm 30 likewise abates in the separating plane 25 and in the pole face 26. The braking moment then predominates again so that the brake arm 29 is pressed by the compression spring 34 against the rotor 12; this leads to braking of the rotor 12. The brake means 22 therefore triggers automatically with the shutoff of the electric motor 10 such that, in an angle grinder for example, the coasting of the cutting-off wheel is automatically stopped in a short time after the motor is turned off.

The stator 11, which is shown only in half-side in FIG. 1 (the lower half of the figure is not shown), has another pole which may or may not be provided with a brake which corresponds to the brake means 22. By providing another brake in a second pole the braking action can be further increased. In any event, the stator 11 is closed roughly in a ring-shape.

In FIG. 2 the top half of the stator 11 from FIG. 1 is shown without the brake element 23 which is to be inserted therein. It is apparent that the free space 21 is made axially not continuous, but is axially bounded by wall segments 37, 38 with a uniform, continuous stator material. The free space 21 is thus made window-like; as shown in FIG. 3. The segments 37, 38 are each provided with semicircular recesses 35, 36 which are used as supports for the pins 27. In this way the pivoting axis 28 is formed.

The invention is not limited to the embodiment shown. Thus the brake means of the invention can also be used for electric motors having more than two-poles. The braking force can directly engage the brake lining or the component which bears it, the brake element is then being used as a disengagement rocker which is coupled to the brake lining or the component which bears it. The compression springs can be formed by one or more leaf spring sheets, rather than the compression springs, which are attached in the pole shoe 15 or to the stator 11 and produce the necessary braking force.

What is claimed is:

1. An electric motor comprising a rotor, an electromagnetic brake means for braking the rotor, and a stator wherein said stator comprises at least one pole pair, in which at least one pole of said pole pair comprises a pole shoe which faces inward towards the rotor and is surrounded by a stator winding, and wherein said at least one role of the stator supports the electromagnetic brake means and wherein the electromagnetic brake means comprises a brake element composed of an electromagnetically conductive material which is urged against a braking force by an attraction force generated by the magnetic flux induced during operation of the motor, wherein said brake element is constructed in the shape of a rocker element and is pivotally supported to pivot about an axis in a radially continuous free space within the stator such that the brake element applies a braking force to the rotor at a position offset from said axis.

2. An electric motor as set forth in claim 1, wherein the radially continuous free space is in the shape of a window and wherein said free space is axially bounded by wall segments.

3. An electric motor as set forth in claim 2, wherein the electromagnetic brake means includes a pin disposed in a corresponding recess in each of the wall segments to support the brake element and to form the axis about which the brake element pivots.

4. An electric motor as set forth in claim 3, wherein the axis, about which the brake element pivots, is parallel to the axis of rotation of the rotor.

5. An electric motor as set forth in claim 1, wherein the brake element is made of a magnetically conductive material end comprises a plurality of faces, one of which forms a part of a pole face facing towards the rotor and other of said faces forming separating surfaces which face the stator.

6. An electric motor as set forth in claim 5, wherein the brake element is formed as a multi-arm lever with one brake arm and one disengagement arm, wherein the brake arm is exposed to the braking force and the disengagement arm exerts a disengagement force on the brake element which is opposite to the braking force when current is flowing through the stator winding.

7. An electric motor as set forth in claim 6, wherein the brake arm is provided with a brake lining on the portion of the brake arm facing the rotor.

8. An electric motor as set forth in claim 6, wherein a face of the disengagement arm on the brake element adjoins the pole face of the stator and is positioned a greater distance from the axis about which the brake arm pivots than a separating surface on the brake arm.

9. An electric motor as set forth in claim 6, wherein the disengagement arm of the brake element includes a portion of the pole face to form an annular gap with the rotor to define a motor air gap.

10. An electric motor as set forth in any one of claims 6, wherein the brake arm is located in front of the axis about which the brake arm pivots when viewed in the direction of rotation of the rotor and the disengagement arm is located behind said axis in the direction of rotation of the rotor.

11. An electric motor as set forth in claim 7, wherein the brake arm comprises a brake lining which has little or no magnetic conductivity.

12. An electric motor as set forth in claim 6, wherein the brake arm has a plurality of blind holes each of which supports one end of a compression spring providing the braking force.

13. An electric motor as set forth in claim 12, wherein the other end of the compression spring is supported on a steady which is attached to the stator.

14. An electric motor as set forth in claim 6, wherein the disengagement arm includes a separating face having a short-circuited turn formed in said face.

15. An electric motor as set forth in claim 1, wherein the electric motor has a pole pair comprising two poles in which each pole contains arm electromagnetic brake means.

* * * * *